United States Patent [19]
Betzold et al.

[11] 4,080,066
[45] Mar. 21, 1978

[54] APPARATUS FOR PREREADING FILM FRAMES OR THE LIKE

[75] Inventors: Wolfram Betzold, Taufkirchen; Horst Bickl, Pullach; Bernd Payrhammer; Helmut Treiber, both of Munich, all of Germany

[73] Assignee: AGFA-Gevaert, A.G., Leverkusen, Germany

[21] Appl. No.: 739,548

[22] Filed: Nov. 8, 1976

[30] Foreign Application Priority Data

Nov. 18, 1975 Germany .............................. 2551750

[51] Int. Cl.² ........................................... G03B 27/78
[52] U.S. Cl. ...................... 355/68; 355/38; 250/559; 356/202
[58] Field of Search ............... 355/68, 35, 38, 41, 355/83, 67, 71, 77; 250/214 P, 559, 571; 356/175, 222, 202, 203

[56] References Cited
U.S. PATENT DOCUMENTS

| | | | |
|---|---|---|---|
| 3,523,728 | 8/1970 | Wick et al. | 355/38 |
| 3,677,641 | 7/1972 | King et al. | 355/68 |
| 3,708,676 | 1/1973 | Huboi et al. | 355/68 |
| 3,790,275 | 2/1974 | Huboi et al. | 355/68 |

*Primary Examiner*—L. T. Hix
*Assistant Examiner*—W. J. Brady
*Attorney, Agent, or Firm*—Peter K. Kontler

[57] ABSTRACT

Apparatus for processing signals which are transmitted by the transducers of photoelectric cells scanning discrete marginal fields of square or rectangular film frames on a web of photographic film has relay-actuated switches which can connect the transducers of selected cells to each other and with the foreground and background inputs of a signal receiving circuit which is connected to the exposure controls of a copying machine or to a data carrier. The frames are examined by an attendant who energizes selected relays or several relays at a time to thereby cause the switches to transmit to the two inputs appropriate signals denoting the density and/or other characteristics of corresponding groups of neighboring marginal fields, depending upon whether the frame which is being inspected by attendant has been exposed in normal orientation, at right angles to normal orientation or upside down.

10 Claims, 2 Drawing Figures

APPARATUS FOR PREREADING FILM FRAMES OR THE LIKE

BACKGROUND OF THE INVENTION

The present invention relates to improvements in apparatus for examining discrete portions of information, especially for examining discrete frames on webs or strips consisting of one or more exposed and developed photographic films. More particularly, the invention relates to improvements in apparatus for producing correction signals for reproduction of film frames or the like in copying machines. Still more particularly, the invention relates to improvements in manually actuatable apparatus which can be used to produce signals based on subjective (visual) inspection of discrete portions of information, especially frames of black-and-white or color photographic films.

It is known to equip a copying machine for the frames of photographic films with a prereader which automatically examines successive frames of an elongated web (the web may consist of a single film but it preferably includes a large number of films which are spliced together end-to-end). The prereader can be installed ahead of the copying machine and is then associated with a suitable data carrier (e.g., magnetic tape, punched tape or magnetic disk) which stores the correction signals in encoded form so that the stored information may be decoded by an automatic reader of the copying machine when the corresponding frames of the web reach the copying station. Alternatively, the prereader can be integrated into the copying machine and transmits appropriate correction signals directly to the exposure controls.

A drawback of automatic prereaders which are integrated into or are independent of copying machines is that the correction signals which are produced therein are not always satisfactory for proper reproduction of film frames. As a rule, one out of 10 film frames which are reproduced in accordance with correction signals furnished by an automatic prereader is unsatisfactory. The reasons for failure of the prereader to furnish appropriate correction signals for each and every frame of one or more photographic films are manifold. For example, the prereader cannot discriminate between color film frames wherein a primary color dominates over the other primary colors and color film frames with an undesirable color shade. Also, the prereader cannot discriminate between frames wherein the density of a particular frame portion or field should deviate considerably from the density of other portions and film frames which can be properly reproduced only if the density of certain portions is reduced or increased. For example, let it be assumed that the density of the most important portion of a film frame deviates considerably from the density of the other part or parts of the same frame, e.g., that the density of the central portion of the photographed Scene or subject is substantially different from the density of the foreground and/or background. If such a frame is reproduced on the basis of information which is supplied by an automatic prereader, the latter will determine the average density of the entire film frame and will produce a corresponding correction signal.

It was already proposed to divide each film frame into several imaginary fields or areas and to determine the density of each field independently of the others. The commonly owned U.S. Pat. No. 3,523,728 to Wick et al. discloses an apparatus which determines the density of a relatively small first portion of each film frame and the tonal distribution of a larger second portion of the same frame. The density of reproduction is determined on the basis of reading of the first portion and the color balance of the print is determined on the basis of reading of the second portion.

U.S. Pat. No. 3,790,275 to Huboi et al. discloses an apparatus which includes three radiation sensitive devices one of which receives radiation from the upper portion of the frame, another of which receives radiation from the lower portion of the frame, and the third of which receives radiation from the central portion of the frame. Thus, the patented apparatus measures the density of the central portion (which is normally the most important part of the frame) independently of the first (upper) and second (lower) portions. Such mode of examining film frames will result in the making of satisfactory reproductions if the camera is always held in the same position whenever the user makes an exposure. This normally holds true when the film in the camera contains square film frames, i.e., the user of the camera is less likely to turn the camera through 90° or upside down if the width of each frame is the same as its height. However, when the film contains rectangular frames, the user is highly likely to change the position of the camera during the making of exposures, usually through 90°. However, it happens again and again that an exposure is made with the square or rectangular frame held upside down, i.e., at 180° to the normal or expected position. The aforediscussed apparatus are then incapable of furnishing satisfactory correction signals because they confuse the foreground with the background (in the case of inverted shots) or a portion of the foreground with a portion of the background (in the case of exposures made with the camera held at an angle of 90° with respect to the normal position). A camera which accepts films with rectangular frames is expected to be held in such position that the longer sides of each frame are parallel with the direction of film transport. Thus, the foreground is located in the lower part, the background in the upper part and the (normally most important) central portion of the photographed scene is located at a level between the upper and lower parts. If the camera is turned through 90° so that the user can make an upright exposure, the foreground is located at one end and the background is located at the other end of the respective frame, as considered in the direction of film transport. If such film frame is introduced into an automatic prereader, the prereader will interpret one-half of the foreground as the background and vice versa.

SUMMARY OF THE INVENTION

An object of the invention is to provide an apparatus which can be manipulated by the person performing a visual (subjective) examination of discrete portions of information on a web-like carrier, especially of successive frames of an exposed and developed photograhic film, in order to enable such person to cause the automatic prereader or the exposure controls to take into consideration unusual or improper orientation of information on certain portions of information.

Another object of the invention is to provide an apparatus which enables an attendant to insure satisfactory reproduction of film frames which were exposed with the camera held in a position other than the normal or anticipated position.

A further object of the invention is to provide an apparatus of the just outlined character which insures that unusual orientation of information on discrete portions of information on a web-like carrier does not entail the making of unsatisfactory reproductions so that the number of second prints and customer complaints can be reduced to a fraction of those which can be anticipated if the information is reproduced in accordance with presently known techniques.

An additional object of the invention is to provide an apparatus which is particularly suited to produce and process signals which can be used to compensate for deviation of orientation of certain portions of information from the orientation of other (normally the majority of) portions of information on a web-like carrier.

An ancillary object of the invention is to provide an apparatus which enables a copying machine to make satisfactory reproductions of square or rectangular film frames regardless of the position in which a frame might have been held during exposure to scene light.

The invention is embodied in apparatus for processing signals which are produced subsequent to visual (subjective) inspection of discrete portions of information on an elongated web-like carrier of information, particularly subsequent to visual inspection of successive frames of an exposed and developed photographic black and white or color film at an inspecting station. The apparatus comprises discrete scanning means (e.g., photoelectric cells) for each of at least four marginal fields of a portion of information at the inspecting station and each scanning means including means (e.g., the photosensitive transducers of the cells) for transmitting signals denoting a characteristic (e.g., density and/or tonal distribution) of the respective field of a portion of information at the inspection station, and manually operable means for combining the signals which are transmitted by the signal transmitting means of different groups of scanning means based on visual determination of the orientation of information borne by the portion of information at the inspecting station. The apparatus preferably further comprises signal receiving means (e.g., an evaluating circuit which can further receive signals from an automatic prereader) having several inputs, preferably a first input for reception of signals denoting the characteristics of fields which form part of the foreground of the image on a film frame, and a second input for reception of signals denoting the characteristics of fields which form part of the background of the image on a film frame. The signal combining means comprises means (e.g., a multi-way electric switch) for applying to the inputs signals from different groups of scanning means, depending on the orientation of the respective film frame during exposure.

The novel features which are considered as characteristic of the invention are set forth in particular in the appended claims. The improved apparatus itself, however, both to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
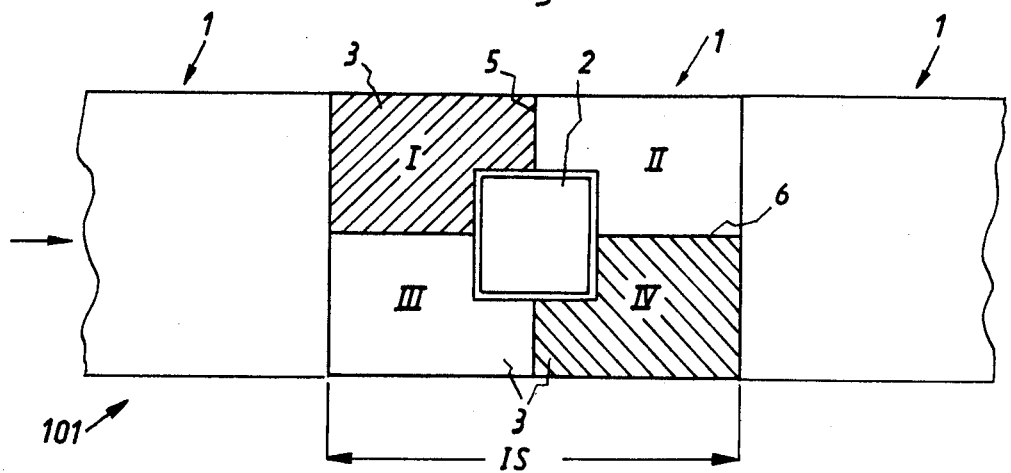
FIG. 1 is a schematic front elevational view of an elongated web of rectangular film frames which can be examined by an attendant in or with the apparatus of the present invention.

FIG. 1 shows a web 101 including a row of rectangular film frames 1 which together constitute at least one exposed and developed color photographic film. The web 101 may consist of a single length of photographic roll film or of a series of spliced-together films. The central portion or field 2 of each film frame 1 is assumed to bear the image of the most important part of the photographed subject or scene. The field 2 which is shown in FIG. 1 is square; however, it can also be rectangular, oval or circular. The remaining portion of the frame 1 surrounds the field 2 and is subdivided into four marginal fields 3 of identical size. The fields 3 include two upper fields I and II which normally represent the background of the photographed scene, and two lower fields III and IV which normally represent the foreground of the photographed scene. This is based on the assumption that the camera in which the film including the frames 1 of FIG. 1 was exposed has been held in the normal position so that the longer sides of each frame 1 were parallel to the direction of film transport and that the upper longer side was located at a level above the lower longer side. The fields I and III are separated from the fields II and IV by an imaginary symmetry plane 5 which is normal to the plane of the respective frame 1, located intermediate the shorter sides of the frame, and halves the central field 2. A second imaginary symmetry plane 6 which is normal to the plane 5 separates the fields I and II from the fields III and IV. Each of the fields I-IV is located in the region of a different corner of the respective frame.

If the exposure is made with a film frame 1 held upside down, the fields I,II constitute the foreground and the fields III, IV constitute the background. If the photographer decides to hold the camera in upright position, the fields I, III constitute the foreground and the fields II, IV constitute the background, or vice versa. The area of each of the fields I-IV is the same, the fields I, III as well as II, IV are mirror symmetrical to each other with reference to the plane 6, and the fields I, II as well as III, IV are mirror symmetrical to each other with reference to the plane 5. The position and area of the central field 2 are selected in such a way that the distance between the horizontal sides of the field 2 and the nearer longer sides of the respective frame 1 is half the width or height of the field 2, and that the distance between the vertical sides of the field 2 and the shorter sides of the frame equals the height or width of the field 2. In other words, the length of each of the fields I-IV is 1½ times the height or width of the field 2, and the width of each of the fields I-IV equals the height or width of the field 2. The just described ratios of the width or height of the central field 2 to the width and length of the fields I-IV are optional, i.e., each frame 1 can be divided into five fields the central field of which is larger or smaller than the illustrated central field 2. Also, the area of each of the four outer or marginal fields I-IV need not be the same, and each frame can be subdivided into more than five fields, e.g., into nine fields including a central field, four marginal fields in the region of the corners of the frame, and four additional marginal fields which alternate with the corner fields.

Figure 2:
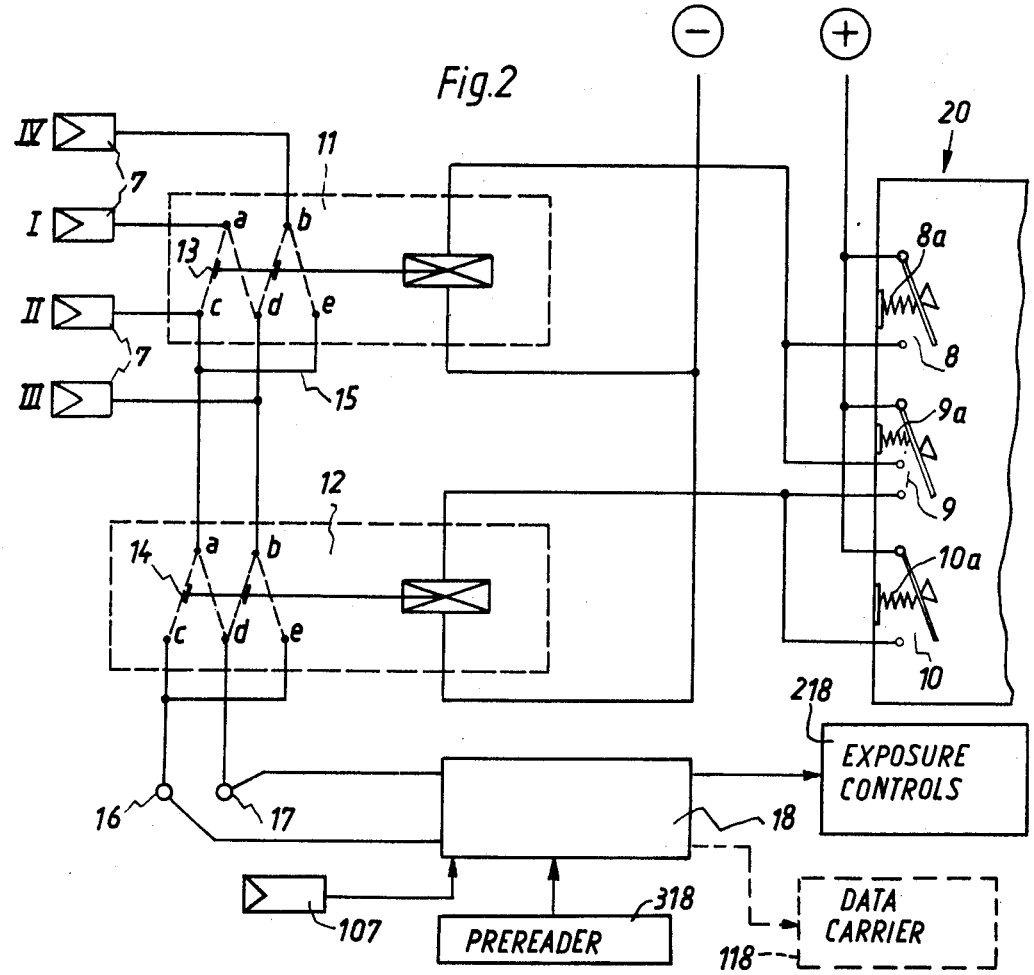
FIG. 2 is a circuit diagram of an apparatus which embodies one form of the invention.

FIG. 2 is a circuit diagram of the apparatus which can be actuated by an attendant who performs a subjective (visual) examination of successive film frames 1 at an inspecting station IS which precedes or follows the automatic prereader. The inspecting station IS may coincide with the copying station if it follows the automatic prereader. The apparatus of FIG. 2 enables the attendant to combine the correction signals which are obtained as a result of scanning of the marginal fields I–IV of any given film frame 1 in a number of ways so as to take into consideration the orientation of images of the frames, i.e., whether the film frames were exposed with the camera held in normal or expected position (so that the fields I, II represent the background and the fields III, IV represent the foreground), with the camera held upside down (the fields III, IV then represent the background and the fields I, II represent the foreground) or with the camera held at 90° to its expected position (the fields I, III then constitute the foreground and the fields II, IV constitute the background, or vice versa).

The means for scanning the four marginal fields I to IV includes four photoelectric cells 7 each of which scans a discrete marginal field. A control panel or keyboard 20 (only a portion of such control panel is shown in FIG. 2) supports three manually operable switches 8, 9 and 10 which are normally open (see the springs 8a, 9a, 10a). When the attendant closes the switch 8, the latter energizes a relay 11. A second relay 12 is energized when the attendant closes the switch 10. Closing of the switch 9 results in simultaneous energization of both relays. The armature of the relay 11 can pivot the movable contacts of a first double-throw switch 13, and the armature of the relay 12 can pivot the movable contacts of a second double-throw switch 14. The input terminals a, b of the switch 13 are respectively connected with the signal transmitting transducers of the cells 7 for the fields I, IV, and the output terminals c, d of the switch 13 are respectively connected with the signal transmitting transducers of the cells 7 for the fields II and III. The output terminal e of the switch 13 is connected with the output terminal c by a conductor 15.

The output terminals c, d of the switch 13 are respectively connected with the input terminals a, b of the switch 14, the output terminals c, d of the switch 14 are respectively connected to the inputs 16, 17 of a signal receiving and evaluating circuit 18, and the output terminal e of the switch 14 is connected to the output terminal c by a conductor 19. The input 16 transmits to the circuit 18 background signals and the input 17 transmits to the circuit 18 foreground signals. The output of the circuit 18 can transmit signals to a data carrier 118 (e.g., a magnetic disk, a magnetic tape or perforated tape indicated by broken lines) if the apparatus of FIG. 2 is not integrated into a copying machine, or directly to the exposure controls 218 of the copying machine if the film frame is being examined by an attendant is located at the copying station, i.e., if such copying station coincides with the station IS.

When the relays 11 and 12 are deenergized, the movable contacts of the switch 13 respectively connect the input terminals a, b with the output terminals c, d. When the relay 11 is energized on closing of the switch 8 or 9, the movable contacts of the switch 13 respectively connect the input terminals a, b with the output terminals d, e. The same applies for the relay 12 and switch 14. The photoelectric cells 7 can determine the density and/or tonal distribution of the respective fields I–IV.

A further photoelectric cell 107 scans the central field 2 of that frame 1 which is located at the station IS. The transducer of the cell 107 is connected with an input of the signal receiving and evaluating circuit 18.

The operation:

When a frame 1 whose orientation is normal reaches the inspecting station IS, the attendant who observes the frame (the frame can be located in front of a ground glass which is mounted in front of a light source) does not touch the movable contacts of the switches 8, 9 and 10, i.e., these switches remain open. Signals from the transducers of the cells 7 for the fields I, II (these fields together constitute the background of the photographed scene) are then transmitted to the input 16 of the evaluating circuit 18 by way of the terminals a, c of the switch 13 and terminals a, c of the switch 14. The transducers of the cells 7 for the fields III, IV (these fields constitute the foreground of the photographed image) are connected to the input 17 of the circuit 18 by way of the terminals b, d of the switches 13 and 14. The signals which represent the density and/or tonal distribution of the field I are added to the signals which represent the density and/or tonal distribution of the field II, and the same applies for the signals which represent the density and/or tonal distribution of the fields III and IV. The circuit 18 transmits appropriate signals to the exposure controls 218 of the copying machine or modifies the signals which are transmitted by the automatic prereader 318 as a result of examination of the same film frame. It will be seen that the attendant need not actuate any component parts of the apparatus when the orientation of the image on a film frame 1 which is subjected to visual examination is normal.

If the attendant observes that the image is upside down, he or she depresses the movable contact of the switch 10 so that the input terminals a and b of the switch 14 are respectively connected with the output terminals d and e. Signals which are transmitted by the transducers of the cells 7 for the fields I and II are then totalized and applied to the input 17 of the evaluating circuit 18 (via terminals a, c of the switch 13 and terminals a, d of the switch 14), and the signals transmitted by the cells 7 for the fields III and IV are then totalized and applied to the input 16 (via terminals b, d of the switch 13 and terminals b, e and conductor 19 of the switch 14).

If the attendant determines that the exposure was made in upright position of the respective film frame 1 (i.e., while the frame was held at 90° to the position shown in FIG. 1), the attendant must further determine whether the fields I, III constitute the foreground or the background of the image. If the foreground includes the fields I and III (i.e., if the background includes the fields II and IV), the attendant depresses the movable contact of the switch 8 so that the input terminals a, b of the switch 13 are respectively connected with the output terminals d, e. Signals from the transducers of the cells 7 for the fields I, III are then totalized and applied to the input 17 via terminals a, d of the switch 13 and terminals b, d of the switch 14. At the same time, signals which are transmitted by the transducers of the cells 7 for the fields II and IV are applied to the input 16 by way of the terminals c (field II) and b, e and conductor 15 (field IV) of the switch 13 and terminals a, c of the switch 14.

If the attendant determines that the fields I and III constitute the background and the fields II and IV constitute the foreground, the moving contact of the switch 9 is depressed to energize the relays 11 and 12. The terminals *a, b* of the switches 13, 14 are then respectively connected with the associated terminals *d, e.* Signals which are transmitted by the transducers of the cells 7 for the fields I and III are totalized and applied to the input 16 by way of the terminals *a, d* of the switch 13 and terminals *b, e* and conductor 19 of the switch 14. At the same time, signals which are transmitted by the transducers of cells 7 for the fields II and IV are applied to the input 17 by way of the terminal *c* (field II) and terminals *b, e* and conductor 15 (field IV) of the switch 13, and terminals *a, d* of the switch 14.

The switch 9 is optional. This switch merely serves for convenience of the attendant who performs the subjective examination of successive film frames. If the switch 9 is omitted, the attendant must depress the moving contacts of the switches 8 and 10 when the fields I, III constitute the foreground of the image on the film frame which is located at the inspecting station IS.

It will be readily appreciated that the improved apparatus can be used with equal advantage for subjective examination of square film frames or analogous portions of information on a web-like carrier.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. Apparatus for processing signals which are produced subsequent to visual inspection of discrete portions of information on an elongated web-like carrier, particularly of the frames of an exposed and developed photographic film, at an inspecting station, comprising discrete scanning means for each of at least four marginal fields of a portion of information at said station, each of said scanning means including means for transmitting signals denoting a characteristic of the respective field of a portion of information at said station; and manually operable means for combining the signals transmitted by the signal transmitting means of different groups of scanning means based on visual determination of the orientation of information borne by the portion which is located at said station.

2. Apparatus as defined in claim 1, further comprising signal receiving means having several inputs, said signal combining means including means for applying to said inputs signals from different groups of scanning means.

3. Apparatus as defined in claim 2, wherein each of said portions of information is a film frame and the information on at least the majority of said frames includes a foreground and a background each embracing at least two of said fields, one of said groups including the fields which are embraced by the foreground and another of said groups including the fields which are embraced by the background.

4. Apparatus as defined in claim 2, wherein said signal combining means comprises a discrete relay for each of said groups, switch means associated with each of said relays, one of said switch means being connected with said signal transmitting means and another of said switch means being connected with said one switch means and said inputs, and manually operable means for energizing said relays at the will of the person performing visual examination of portions of information at said station.

5. Apparatus as defined in claim 2, wherein each of said portions of information is of square or rectangular outline and said fields include a discrete field in the region of each corner of the respective portion of information, said signal combining means comprising a switch having terminals connected with the signal transmitting means of scanning means for each of said discrete fields and contact means movable between a plurality of positions in each of which the signal transmitting means of scanning means for a different pair of neighboring discrete fields are connected to each other, and means for moving said movable contact means.

6. Apparatus as defined in claim 5, further comprising second switch means connected between said first mentioned switch means and said inputs, and means for actuating said second switch means to thereby apply signals transmitted by signal transmitting means of scanning means for different pairs of neighboring fields to selected inputs of said receiving means.

7. Apparatus as defined in claim 6, wherein said moving means comprises a first relay and manually operated means for energizing said first relay, said actuating means including a second relay and manually operated means for energizing said second relay.

8. Apparatus as defined in claim 7, further comprising manually operated means for simultaneously energizing said first and second relays.

9. Apparatus as defined in claim 6, further comprising data carrier means connected with said receiving means and arranged to store signals in encoded form.

10. Apparatus as defined in claim 6, further comprising a copying machine for said portions of information, said machine including exposure control means connected with said signal receiving means.

* * * * *